(12) United States Patent
Reynolds et al.

(10) Patent No.: US 7,998,604 B2
(45) Date of Patent: Aug. 16, 2011

(54) ARTICLE HAVING COMPOSITE LAYER

(75) Inventors: George H. Reynolds, Sanford, ME (US); Christopher W. Strock, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 784 days.

(21) Appl. No.: 11/946,100

(22) Filed: Nov. 28, 2007

(65) Prior Publication Data

US 2009/0136740 A1 May 28, 2009

(51) Int. Cl.
B32B 15/04 (2006.01)
B32B 18/00 (2006.01)

(52) U.S. Cl. ........ 428/701; 428/469; 428/689; 428/697; 428/702

(58) Field of Classification Search .................. 428/402, 428/406, 409, 423, 428, 457, 469, 704, 689 428/697, 701, 702
See application file for complete search history.

(56) References Cited

U.S. PATENT DOCUMENTS

| | | | |
|---|---|---|---|
| 3,084,064 A | 4/1963 | Cowden | |
| 3,342,626 A | 9/1967 | Batchelor | |
| 3,879,831 A | 4/1975 | Rigney | |
| 4,664,973 A | 5/1987 | Otfinoski | |
| 4,783,341 A | 11/1988 | Packer | |
| 5,536,022 A | 7/1996 | Sileo | |
| 5,780,116 A | 7/1998 | Sileo | |
| 5,780,171 A * | 7/1998 | Nissley et al. | 428/629 |
| 5,966,585 A | 10/1999 | Sue | |
| 5,976,695 A | 11/1999 | Hajmrle | |
| 6,537,021 B2 | 3/2003 | Howard | |
| 6,730,413 B2 | 5/2004 | Schaeffer | |
| 6,887,530 B2 * | 5/2005 | Fiala et al. | 427/456 |
| 2002/0064667 A1 | 5/2002 | Scheckenbach | |
| 2003/0180565 A1* | 9/2003 | Herbst-Dederichs | 428/553 |
| 2005/0124505 A1* | 6/2005 | Hajmrle et al. | 508/155 |
| 2005/0287348 A1* | 12/2005 | Faler et al. | 428/315.5 |

FOREIGN PATENT DOCUMENTS

| | | |
|---|---|---|
| EP | 0426485 | 5/1991 |
| EP | 1077272 | 2/2001 |
| EP | 1428600 | 6/2004 |
| GB | 2273109 | 6/1994 |
| GB | 2317899 | 4/1998 |
| WO | 99/36590 | 7/1999 |
| WO | 03/104511 | 12/2003 |
| WO | 2005/002742 | 1/2005 |

OTHER PUBLICATIONS

Christie et al., Mineral Commodity Report 20—Clays, obtained Oct. 2010.*
Encyclopedia Britannica (www.britannica.com).*
EP Search Report dated May 6, 2011.

* cited by examiner

*Primary Examiner* — Timothy M Speer
*Assistant Examiner* — Lauren Robinson
(74) *Attorney, Agent, or Firm* — Carlson, Gaskey & Olds, P.C.

(57) ABSTRACT

A composite article includes a substrate and a layer attached to the substrate. The layer includes a metal phase, a first ceramic phase, and a second ceramic phase.

28 Claims, 2 Drawing Sheets

ARTICLE HAVING COMPOSITE LAYER

BACKGROUND OF THE INVENTION

This disclosure relates to articles having a layer, such as an abradable layer, that includes a metal phase and ceramic phases.

Components that are exposed to high temperatures, such as gas turbine engine components, typically include a protective coating system having one or more coating layers. For example, air seals located radially outwards of rotating engine blades in the turbine section typically include the coating system to protect from erosion, oxidation, corrosion or the like and also to facilitate efficient operation of the engine. In the compressor and fan sections where temperatures are within the temperature capability of metal alloys, the coating layer(s) are designed primarily to minimize blade tip clearance to the outward air seals. However, some air seals are radially inward when vanes are supported at the outer diameter and seal against the rotating shaft.

Some conventional air seals include an abradable layer that contacts tips of the blades during engine operation such that the blades abrade the layer upon operation of the engine. The abrasion between the layer and blade tips provides a minimum clearance between these components to reduce gas flow around the tips of the blades and thereby facilitate efficient interaction between the gas flow and the blades.

Although effective, existing abradable layers can be expensive to manufacture. For example, a plasma spray process may be used to deposit a powder onto an air seal as the abradable layer. However, the powder does not strongly adhere to the air seal during the spray process. Therefore, a significant amount of powder may be consumed in the spray process without being deposited onto the air seal, which contributes to the expense of manufacturing.

SUMMARY OF THE INVENTION

The disclosed example articles and methods are for facilitating economic manufacturing of a composite layer, such as an abradable layer.

One example article includes a substrate and a layer attached to the substrate. The layer includes a metal phase, a first ceramic phase, and a second ceramic phase. For example, one of the ceramic phases functions as a binding agent that binds the other ceramic phase.

An example method of manufacturing an article includes forming the article with a layer having the metal phase, the first ceramic phase, and the second ceramic phase. For example, during the forming process, one of the ceramic phases melts and wets the other ceramic phase to facilitate bonding of the non-melted ceramic phase to the substrate.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
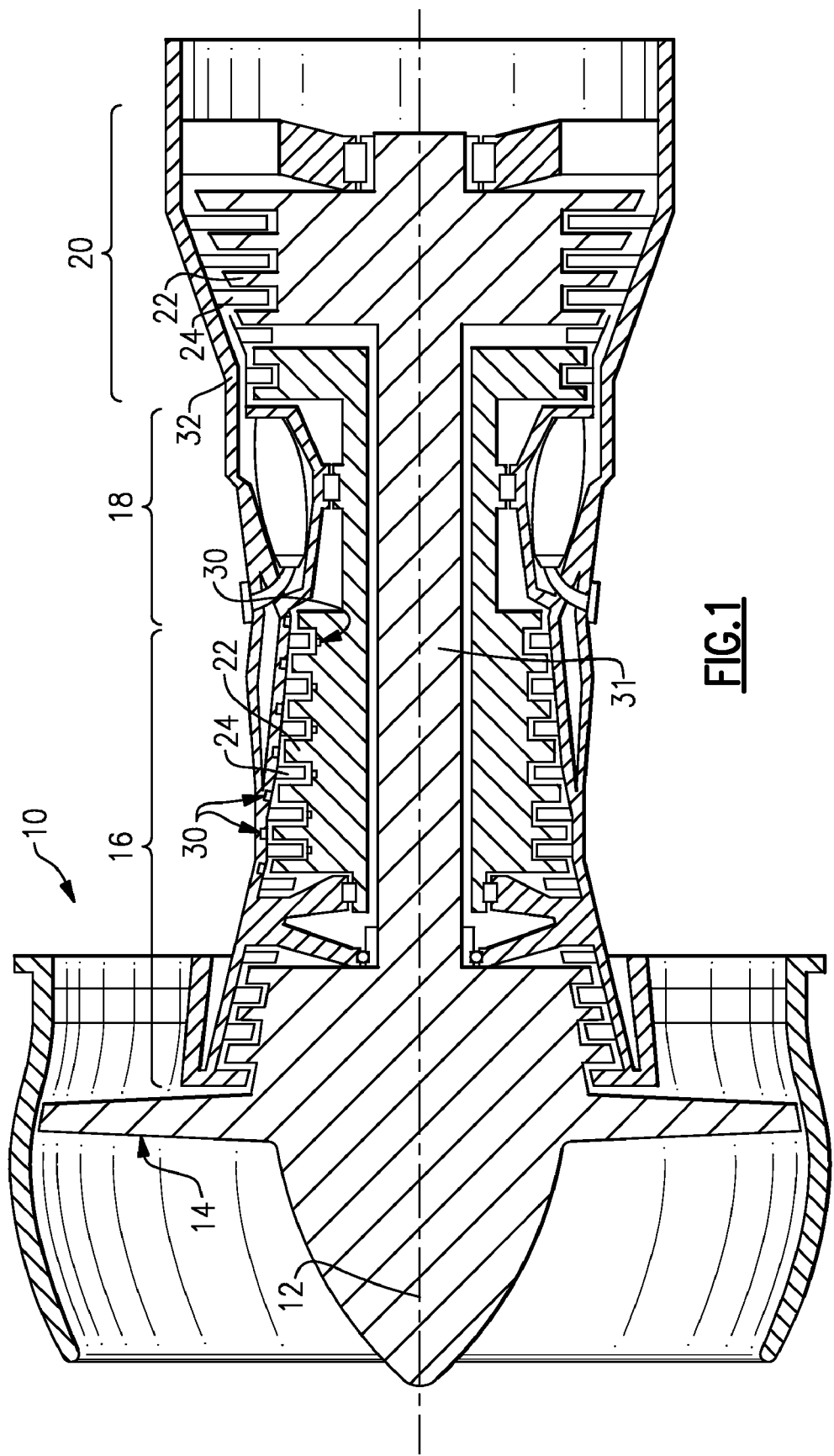
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 includes a fan 14, a compressor section 16, a combustion section 18 and a turbine section 20. Each of the compressor section 16 and the turbine section 20 include blades 22 that are rotatable about the centerline 12 and non-rotatable vanes 24. As is known, air compressed in the compressor section 16 is mixed with fuel and burned in the combustion section 18 to produce hot gases that are expanded in the turbine section 20. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

The gas turbine engine 10 includes a plurality of articles 30 that are located radially outwards of corresponding blades 22 of the compressor section 16 and/or the turbine section 20. For example, the articles 30 are outer air seals. The articles 30 may be formed as portions of a case 32 that generally surrounds the compressor section 16 and/or the turbine section 20. The articles 30 may alternatively be mechanically attached to the case 32 in any suitable manner. A plurality of the articles 30 may be mounted circumferentially about the compressor section 16 in a ring, for example.

A plurality of the articles 30 may also be used radially inwards of the vanes 24 of the compressor section 16 and/or the turbine section 20. For example, the articles 30 may rotate with a shaft 31 of the engine 10, or be located at the tips of the vanes 24 for sealing contact with a corresponding seal that rotates with the shaft 31. Although the illustrated example refers to the articles 30 being located in the compressor section 16, the articles 30 are not limited to use in the compressor section 16 and may be used in the turbine section 20 or in non-aerospace applications.

Figure 2:
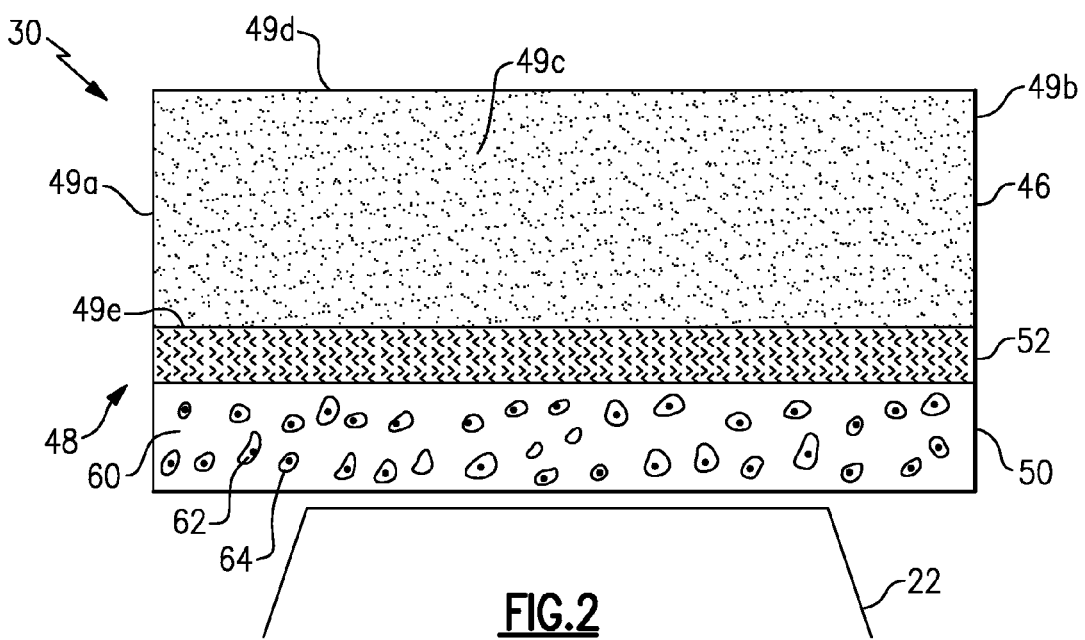
FIG. 2 illustrates an example composite article used in the gas turbine engine.

FIG. 2 illustrates an example article 30 that includes a substrate 46 having an abradable coating system 48 disposed thereon. For example, the article 30 is a seal member that extends between a leading end 49a and a trailing end 49b, circumferential sides 49c (one shown), and a first side 49d and a second side 49e. The abradable coating system 48 is disposed on the second side 49e, which may be a radially inner or outer side, depending on the location relative to the engine centerline A, blades 22, and vanes 24. The abradable coating system 48 also includes a layer 50 and, optionally, a bond layer 52 between the layer 50 and the substrate 46. For example, the bond layer 52 facilitates bonding between the layer 50 and the substrate 46, but may not be needed if the protective properties of the bond layer 52 are not desired and/or if the layer 50 bonds to the substrate 46 with a desired amount of strength.

The bond layer 52 may be any suitable material for bonding. For example, the bond layer 52 may include a nickel alloy, platinum, gold, silver, or MCrAlY, where the M includes at least one of nickel, cobalt, iron, or a combination thereof, Cr is chromium, Al is aluminum and Y is yttrium. Although a particular abradable coating system 48 is disclosed, it is to be understood that the disclosed examples are not limited to the illustrated configuration and may include additional layers.

In operation, the layer 50 functions as an abrasion layer with regard to the rotating blades 22 or stationary vanes 24 of the compressor section 16, for example. That is, the layer 50 is abradable and may be worn away through contact with the tips of the blades 22, tips of the vanes 24, or a platform section of the vanes 24 to thereby facilitate efficient interaction between gas flow through the compressor section 16 and the blades 22 and vanes 24. In this regard, the layer 50 wears away smoothly to facilitate maintaining an aerodynamic surface. For example, a worn away surface of the layer 50 may include a surface roughness of about 1-600 microinches (0.0254-15.25 micrometers). The layer 50 also provides strong bonding during deposition of the layer 50, which facilitates economic manufacturing. The term "about" as used in this description relative to a given value refers to possible variation in the value, such as normally accepted variations or tolerances in the art.

The layer 50 is a composite of a metal phase 60, a first ceramic phase 62, and a second ceramic phase 64. For example, the materials of the metal phase 60, the first ceramic phase 62, and the second ceramic phase 64 may be selected to provide desirable characteristics of the layer 50, such as a desired density, porosity, abradability, and the like.

The first ceramic phase 62 and the second ceramic phase 64 may be selected from any of various types of ceramic materials. For example, the first ceramic phase 62 includes at least one of boron nitride or graphite, and the second ceramic phase 64 includes at least one of a clay material or a metal oxide. The clay material or the metal oxide of the second ceramic phase 64 agglomerates (e.g., clusters together) with the first ceramic phase 62 to facilitate adherence of the first ceramic phase 62 to the second ceramic phase 64. In this regard, the material selected for the second ceramic phase 64 may exhibit hydrogen bonding or other polar interactions that facilitate agglomeration to thereby physically bind particles of the first ceramic phase 62. As will be described more fully below, agglomeration facilitates adhering the first ceramic phase 62 to the second ceramic phase 64 and substrate 46 (or bond layer 52, if used).

Various types of clays may be used as the second ceramic phase 64. Generally, a clay is a naturally occurring mineral, such as a phyllosilicate. For example, the clay may be a hydrous aluminum phyllosilicate. In a further example, the hydrous aluminum phyllosilicate includes at least one of kaolinite, smectite, or chlorite. Any of the various types of kaolinite may be used, such as dicktite, halloysite, serpentine kaolinite, or nacrite. Similarly, any of the various types of smectite may be used, such as pyrophyllite, talc, vermiculite, sauconite, saponite, nontronite, or montmorillonite (e.g., bentonite).

Additionally, the clay may include any desired average particle size for achieving a desired degree of agglomeration. That is, relatively larger particles may have lower specific surface areas that do not facilitate agglomeration as well as smaller particles having higher specific surface areas. For examples, the clay may include an average particle size that is less than or equal to about 5 micrometers (196.9 microinches). In a further example, the clay includes an average particle size that is less than or equal to about 2 micrometers (78.7 microinches). Thus, a desired degree of agglomeration may be achieved through the selection of clay and particle size according to the given examples.

Various types of metal oxides may be used as the second ceramic phase 64. For example, the metal oxide may include at least one oxide of silicon, aluminum, titanium, zirconium, yttrium, chromium, molybdenum, iron, or copper. Given this description, one of ordinary skill in the art will be able to select other types of metal oxides to meet their particular needs.

Additionally, a combination of metal oxides may also be used. For example, the combination may include any two or more of the given example oxides. In a further example, the combination includes about 87 wt % of aluminum oxide and about 13 wt % of titanium dioxide. In another example, the combination includes about 93 wt % of zirconium oxide and about 7 wt % of yttrium oxide. In another example, the combination includes about 80 wt % of zirconium oxide and about 20 wt % of yttrium oxide. In another example, the combination includes about 60 wt % of zirconium oxide and about 40 wt % of aluminum oxide.

Similar to the clays, the metal oxide may be used with any desired particle size for achieving a desired degree of agglomeration with the first ceramic phase 62. For example, the metal oxide or combination of metal oxides includes an average particle size that is less than or equal to about 2 micrometers (78.7 microinches). In a further example, the metal oxide or combination of metal oxides includes an average particle size of less than or equal to about 1 micrometer (39.4 microinches). In yet a further example, the metal oxide or combination of metal oxides includes an average particle size that is less than or equal to about 200 nanometers (7.9 microinches).

The metal oxide may also be a silica-based glass. For example, the silica-based glass may also include an additive, such as sodium carbonate, calcium oxide, magnesium oxide, aluminum oxide, boron, lanthanum, lithium, barium, iron, or cerium oxide. The additives may be used to adjust the properties of the silica based glass, such as the melting point or physical properties. The additives may also vary the wetting properties of the silica-based glass. For example, boron in the silica-based glass may facilitate wetting between the silica-based glass and boron nitride as the first ceramic phase 62.

In at least some examples, the second ceramic phase 64 functions as a bonding agent between the first ceramic phase 62 and the metal phase 60. That is, the ceramic material selected for the first ceramic phase 62 may not bond with a desired degree of strength to the metal phase 60. The second ceramic phase 64 binds the first ceramic phase 62 and bonds with the metal phase 60 to facilitate stronger bonding of the first ceramic phase 62 to the metal phase 60.

The metal phase 60 may be selected from any suitable type of metal for an intended application. For example, the metal phase 60 may include nickel, copper, molybdenum, aluminum, or other metal phase. The metal phase 60 may also be an alloy, such as a nickel alloy. Several example nickel alloys are disclosed in co-owned U.S. Pat. Nos. 5,536,022 and 5,780, 116, but the nickel alloys need not be limited to the alloys disclosed therein.

The given example ceramic materials for the first ceramic phase 62 and the second ceramic phase 64 may be utilized in the layer 50 in any desired combined amount for achieving desired characteristics of the layer 50. For example, the combined amount may include about 1-33 wt % of the second ceramic phase 64 and a remainder being the first ceramic phase 62. In a further example, the combined amount includes about 10-20 wt % of the second ceramic phase 64 and a remainder being the first ceramic phase 62. In a further example, the combined amount includes about 10 wt % of the second ceramic phase 64 and a remainder being the first ceramic phase 62. As can be appreciated, ceramic materials other than the given examples may be used in the abovedisclosed amounts and therefore, the layer 50 need not be limited to the given compositions.

Similarly, the layer 50 may include desired amounts of the metal phase 60, the first ceramic phase 62, and the second ceramic phase 64 for achieving desired characteristics of the layer 50. For example, the layer 50 may include about 5-15 vol % porosity, about 20-66 vol % of the combined volume of the first ceramic phase 62 and the second ceramic phase 64, and a remainder volume of the metal phase 60. It is to be understood that the porosity of the layer 50 may be in the range of 5-15 vol %, but is not limited to the example porosity range.

In some examples where the metal phase 60 comprises more than 50 vol % of the layer 50, the layer 50 has an architecture comprising the metal phase 60 as a matrix relative to the first ceramic phase 62 and the second ceramic phase 64. However, the metal phase 60 may still be interconnected as a matrix if the metal phase 60 is below 50 vol %. Additionally, the first ceramic phase 62 and the second ceramic phase 64 are agglomerated such that the second ceramic phase 64 at least partially surrounds the first ceramic phase 62. In this regard, the second ceramic phase 64 may be a matrix relative to the first ceramic phase 62.

Figure 3:
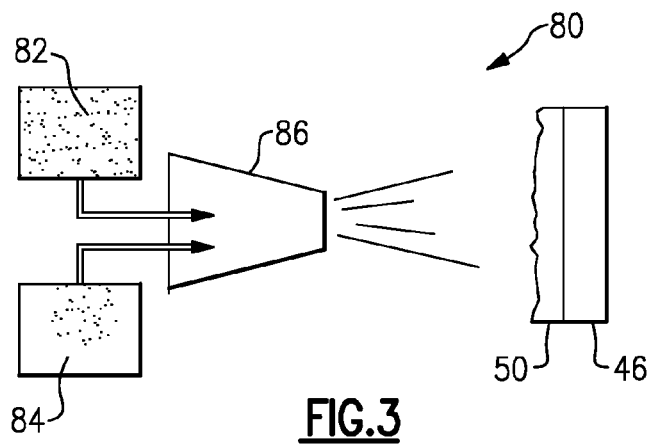
FIG. 3 illustrates an example method for forming a layer of the composite article.

The layer 50 may be formed using any of various types of techniques. FIG. 3 illustrates one example method 80 for forming the layer 50; however, other types of methods may be used. In this example, the method 80 is a thermal spraying process that utilizes a first powder 82 of the metal phase 60 and a second powder 84 that is a composite of the first ceramic phase 62 and the second ceramic phase 64. The powders 82 and 84 are fed into a thermal spray device 86, which heats the powders 82 and 84 to a desired temperature and sprays the powders 82 and 84 onto the substrate 46 to thereby form the layer 50.

The powder 84 comprises composite particles of the first ceramic phase 62 and second ceramic phase 64. The particles may be formed using any desired particle forming technique such as, but not limited to, radio frequency plasma formation, spray drying, tumbling, caking, sintering, crushing, melt slurry formation, atomizing, and combinations thereof.

In some examples, the powder 84 also includes a polymer, to bind the first ceramic phase 62 and the second ceramic phase 64 together. The polymer may be used when relatively large particle sizes of the second ceramic phase 64 are used, such as particles larger than about 2 micrometers (78.7 microinches). The larger particles may have lower specific surface areas that do not agglomerate as well as smaller particles having higher specific surface areas. Additionally, if the material selected for the second ceramic phase 64 does not agglomerate to a desired degree, the polymer may be used to facilitate binding the first ceramic phase 62 in the powder 84. For example, the polymer may be polyvinylalcohol. Given this description, one of ordinary skill in the art will recognize other types of polymers to suit their particular needs.

During the thermal spray process, the thermal spray device 86 heats and melts at least a portion of the powder 82 and a portion of the powder 84. That is, the metal phase 60 of the powder 82 melts and the second ceramic phase 64 of the powder 84 melts. The first ceramic phase 62 does not melt in the process and remains solid. For example, the selected temperature used in the thermal spray process may not exceed the melting temperature of the first ceramic phases 62. Thus, the unmelted first ceramic phase 62 would normally be prone to deflecting off of the substrate 46 (or bond layer 52, if used) upon impact during the spraying process. However, the melted second ceramic phase 64 facilitates adhering the unmelted first ceramic phase 62 to the substrate 46 by wetting the surfaces of the unmelted first ceramic phase 62. The melted second ceramic phase 64 thereby functions as a bonding agent to facilitate "sticking" the unmelted first ceramic phase 62 to the substrate 46 (or bond layer 52, if used) and metal phase 60.

Although the metal phase 60 is also melted in the spraying process, the metal phase 60 may not significantly wet the unmelted first ceramic phase 62. For example, if the metal phase 60 is separately fed into the thermal spray device 86, droplets of the metal phase 60 in the spray plume from the device 86 would have to contact the unmelted first ceramic phase 62 to initiate wetting. Moreover, the metal phase 60 may not be chemically compatible with wetting the surfaces of the unmelted phase. However, the phases 62 and 64 are agglomerated in the powder 84 such that the phases 62 and 64 are already in fused contact when fed into the device 86, which facilitates a contact between the phases 62 and 64 during spraying to promote wetting. Additionally, the ceramic materials used for the phases 62 and 64 are chemically compatible such that the melted second ceramic phase 64 wets the unmelted first ceramic phase 62. The degree of compatibility may vary, depending on the type of ceramic material selected.

Figure 4:
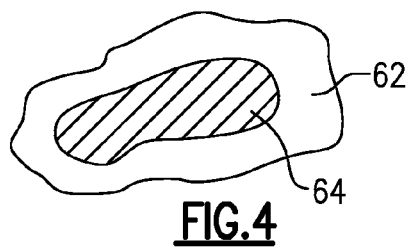
FIG. 4 illustrates an example of montmorillonite wetting the surfaces of boron nitride.

In a further example, if the first ceramic phase 62 is boron nitride and the second ceramic phase 64 is montmorillonite, boron nitride sublimes around 5200° F. (about 2871° C.) but does not melt under the lower temperatures that are used to melt the montmorillonite and metal phase 60 for the thermal spray process. The montmorillonite wets the surfaces of the boron nitride, as shown schematically in FIG. 4, for example. Hydrogen bonding interactions or other polar interactions between the melted montmorillonite and the unmelted boron nitride facilitate relatively low angle wetting. The melted montmorillonite thereby functions as a binding agent to facilitate adhering the boron nitride to the metal phase 60 and substrate 46 (or bond layer 52, if used). As can be appreciated, the types of materials selected for the first ceramic phase 62 and the second ceramic phase 64 may determine the degree of wetting that occurs between the melted and unmelted phases, and thus also determine the degree to which the melted phase facilitates adherence.

The binding provided by the second ceramic phase 64 during the spraying process facilitates economic manufacturing of the layer 50 and a desirable degree of abradability. For example, the binding facilitates consuming less of the first ceramic phase 62 than would otherwise be consumed without using the second ceramic phase 64 because deflection off of the substrate 46 may be reduced. Also, the spraying process may be conducted at higher speeds because of the reduced deflection. Additionally, the second ceramic phase 64 reduces an amount of the first ceramic phase 62 and metal phase 60 that are used. Thus, if expensive materials are used for the first ceramic phase 62 and the metal phase 60, the expense associated with using these materials for the layer 50 is reduced. Additionally, the bonding characteristics of the second ceramic phase 64 increases the strength and resistance to erosion of the abradable layer 50, allowing the amount of first ceramic phase 62 and second ceramic phase 64 that is used in the layer 50 to be increased thereby reducing the overall density of the layer 50, which in turn results in the gas turbine engine 10 being lighter. Better bonding equates to improved erosion resistance for a given density abradable, thereby allowing more low density ceramic phase to be used and reducing the density of the composite.

Although a combination of features is shown in the illustrated examples, not all of them need to be combined to realize the benefits of various embodiments of this disclosure.

In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A composite article comprising:
   a substrate; and
   a layer attached to the substrate, the layer comprising a metal phase that is continuous, a first ceramic phase, and a second ceramic phase, wherein the first ceramic phase and the second ceramic phase are agglomerated together and disposed within the metal phase.

2. The composite article as recited in claim 1, wherein the first ceramic phase comprises at least one of boron nitride or graphite and the second ceramic phase comprises at least one of a clay or a metal oxide.

3. The composite article as recited in claim 2, wherein the second ceramic phase comprises the clay, and the clay comprises a hydrous aluminum phyllosilicate.

4. The composite article as recited in claim 3, wherein the hydrous aluminum phyllosilicate comprises at least one of kaolinite, smectite, or chlorite.

5. The composite article as recited in claim 4, wherein the hydrous aluminum phyllosilicate is the kaolinite, and the kaolinite comprises at least one of dicktite, halloysite, serpentine kaolinite, or nacrite.

6. The composite article as recited in claim 4, wherein the hydrous aluminum phyllosilicate is the smectite, and the smectite comprises at least one of pyrophyllite, talc, vermiculite, sauconite, saponite, nontronite, or montmorillonite.

7. The composite article as recited in claim 2, wherein the second ceramic phase comprises the clay, and the clay comprises an average particle size less than or equal to about 5 micrometers.

8. The composite article as recited in claim 2, wherein the second ceramic phase comprises the clay, and the clay comprises an average particle size less than or equal to about 2 micrometers.

9. The composite article as recited in claim 2, wherein the second ceramic phase comprises the metal oxide, and the metal oxide comprises at least one oxide of silicon, aluminum, titanium, zirconium, yttrium, chromium, molybdenum, iron, or copper.

10. The composite article as recited in claim 9, wherein the metal oxide comprises about 87 wt % aluminum oxide and about 13 wt % titanium oxide.

11. The composite article as recited in claim 9, wherein the metal oxide comprises about 93 wt % of zirconium oxide and about 7 wt % of yttrium oxide.

12. The composite article as recited in claim 9 wherein the metal oxide comprises about 80 wt % of zirconium oxide and about 20 wt % of yttrium oxide.

13. The composite article as recited in claim 9, wherein the metal oxide comprises about 60 wt % of zirconium oxide and about 40 wt % of aluminum oxide.

14. The composite article as recited in claim 2, wherein the second ceramic phase comprises the metal oxide, and the metal oxide comprises a silica-based glass.

15. The composite article as recited in claim 14, wherein the silica-based glass includes at least one of sodium carbonate, calcium oxide, magnesium oxide, aluminum oxide, boron, lanthanum, lithium, barium, iron, or cerium oxide.

16. The composite article as recited in claim 2, wherein a combined amount of the first ceramic phase and the second ceramic phase includes about 1-33 wt % of the second ceramic phase.

17. The composite article as recited in claim 16, wherein the combined amount includes about 10-20 wt % of the second ceramic phase.

18. The composite article as recited in claim 16, wherein the combined amount includes about 10 wt % of the second ceramic phase.

19. The composite article as recited in claim 1, wherein the first ceramic phase comprises boron nitride and the second ceramic phase comprises montmorillonite.

20. The composite article as recited in claim 1, wherein the first ceramic phase comprises graphite and the second ceramic phase comprises montmorillonite.

21. The composite article as recited in claim 1, wherein the first ceramic phase and the second ceramic phase comprise about 20-66 vol % of the layer.

22. The composite article as recited in claim 1, wherein the substrate is a seal member comprising a body that defines two sides, a leading edge and a trailing edge, and an inner side and an outer side, wherein the layer is attached to one of the inner side or the outer side.

23. The composite article as recited in claim 1, wherein the metal phase includes at least one of nickel, molybdenum, or aluminum.

24. The composite article as recited in claim 1, wherein the first ceramic phase comprises a first ceramic phase average particle size and the second ceramic phase comprises a second ceramic phase average particle size such that a ratio of the second ceramic phase average particle size to the first ceramic phase average particle size is between 1:1 and 25:1.

25. The composite article as recited in claim 1, wherein the layer includes 5-15 vol % porosity.

26. The composite article as recited in claim 25, wherein the layer additionally includes 20-66 vol % of the combined volume of the first ceramic phase and the second ceramic phase and a remainder volume of the metal phase.

27. A composite article comprising:
   a substrate; and
   a layer attached to the substrate, the layer comprising a metal phase, a first ceramic phase, and a second ceramic phase, wherein the second ceramic phase comprises about 87 wt % aluminum oxide and about 13 wt % titanium oxide or about 93 wt % of zirconium oxide and about 7 wt % of yttrium oxide, and the first ceramic phase and the second ceramic phase are agglomerated together and disposed within the metal phase.

28. A composite article comprising;
   a substrate; and
   a layer attached to the substrate, the layer comprising a metal phase, a first ceramic phase, and a second ceramic phase, wherein the first ceramic phase comprises at least one of boron nitride or graphite and the second ceramic phase comprises a metal oxide that includes at least one oxide of yttrium, molybdenum, or copper, and the first ceramic phase and the second ceramic phase are agglomerated together and disposed within the metal phase.

* * * * *